(12) United States Patent
Cupina

(10) Patent No.: US 6,555,193 B1
(45) Date of Patent: Apr. 29, 2003

(54) LAMINATED ADHESIVE BACKED COLOR CORRECTION AND LIGHT-DIFFUSION FILTERS

(76) Inventor: Jonathan Ryan Cupina, 1333 Quail Ridge Dr., Reston, VA (US) 20194

(*) Notice: Subject to any disclaimer, the term of this patent is extended or adjusted under 35 U.S.C. 154(b) by 0 days.

(21) Appl. No.: 09/615,834

(22) Filed: Jul. 13, 2000

Related U.S. Application Data
(60) Provisional application No. 60/143,919, filed on Jul. 14, 1999.

(51) Int. Cl.[7] ................................................. F12V 9/00
(52) U.S. Cl. ..................... 428/40.1; 359/358; 359/359; 359/589; 359/590; 428/41.6; 428/41.7; 428/41.8; 428/41.9; 428/42.1; 428/42.2; 428/205; 428/409; 428/913
(58) Field of Search ............................. 428/40.1, 41.6, 428/41.7, 41.8, 42.1, 41.9, 42.2, 43, 205, 1.61, 1.1, 409, 913; 359/358, 359, 590, 589

(56) References Cited

U.S. PATENT DOCUMENTS
6,104,530 A * 8/2000 Okamura ..................... 359/359
6,165,389 A * 12/2000 Asher ........................... 252/582

* cited by examiner

Primary Examiner—Nasser Ahmad

(57) ABSTRACT

Laminated adhesive-backed color-correction and light-diffusion filters are comprised of a gel layer having a desired light wavelength characteristic, one face of which is affixed by means of an optically transparent adhesive to an optically transparent supporting substrate. The other side of the supporting substrate is fixed, by means of an optically transparent adhesive layer, to an optically transparent peelable protective film. This process is done in such a way that no distortion, irregularities, or imperfections are detectable on any surface, allowing clear visual inspection and full color-corrective quality. Moreover, more than one such filter can be combined to achieve unique results.

6 Claims, 4 Drawing Sheets

LAMINATED ADHESIVE BACKED COLOR CORRECTION AND LIGHT-DIFFUSION FILTERS

CROSS-REFERENCE TO RELATED APPLICATIONS

This application claims the benefit of Provisional Patent Application Ser. No. 60/143,919, filed Jul. 14, 1999.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to lighting, specifically to the color-correction and diffusion of natural and artificial light, as used in photographic and entertainment applications. For the purposes of this patent application, entertainment applications include, but are not limited to, theater, multimedia, film, television, commercials, digital video and other mediums where entertainment occurs be it live or previously recorded.

DESCRIPTION OF PRIOR ART

As photographic, entertainment and visual medium technologies have evolved, a parallel demand for evolution in lighting technology has arisen. As a result, methods of controlling light by altering the color and softening the intensity have become necessary to achieve optimal aesthetically pleasing imagery. This was achieved by placing a translucent sheet of desired color in front of the lighting fixture, thereby coloring the light beam.

Modem lighting and color-correction have since advanced to the point at which any conceivable color and mood can be attained. As a result, the use of color-correction and light-diffusion filters (hereinafter referred to as "gel") is commonplace. As photographic, entertainment and visual medium productions have become more extravagant; the level of detail lighting has increased. For many years, color-correction and light-diffusion technology has remained the same, consisting of a plastic sheeting material dyed to a specific color by various processes. When placed in front of a lighting fixture or onto the surface of a window, the gel acts as a filter altering the light beam to match the color of the gel. Technicians skilled in the art are very familiar with current gel embodiments, their necessity and their application.

Though gels are employed in numerous ways, little consideration has been given to a design that is better suited to meet applications encountered in the workplace. Numerous patents embody various aspects of tapes, laminates, optics, filters and photography. (See for example, U.S. Patents listed below.)

U.S. Pat. Nos. 3,892,900, 4,681,784, 4,584,220, 4,937,116, 5,014,174, 5,786,092, 4,636,438, and 5,091,232. Current commercially available gels are exemplified by the catalogues of Lee Filters, (see 1999 catalog pages 25 and 26), Rosco, (see catalog #39, 1999 pages 12 and 13), and GAMPRODUCTS Inc., (see 1998 catalog pages 4, 5 and 6). Current industry embodiments of gels, though effective for their color-corrective and diffusive qualities, have many disadvantages.

The disadvantages of Prior Art embodiments may be summarized as follows;

a) Clips, tape, or other means of attachment are required to secure gels to lighting fixtures.

b) Because securing is required, the technician must ensure that the gels are secured in a way such that the securing means will not cast a shadow or interfere with a shot.

c) Because additional securing means are needed, additional time and energy are spent in locating that means and as well as applying it to the gel.

d) Because a securing means is required, there is always the possibility of uncorrected light leakage from peripheral regions of the fixture.

e) Because securing means is required, extra time is needed to perform repetitive detail work on multiple fixtures. Moreover, the means of securing be they clips or tape, is wasted.

f) Due to its lack of self-adhesive means, often more gel than is needed to correct the light must be used in order to have something sufficient to attach to.

g) Because of its need for a securing method, the gel is extremely difficult to use on small lighting fixtures, which often have little area to which the technician can secure the gel.

h) Holes and tears are currently patched with transparent tape, often leaving unusable areas where uncorrected light is visible.

i) When a standard gel is cut too small to cover a particular fixture, it must be discarded and a new piece cut.

j) The gel material is easily crumpled, creased, torn, and ripped. Reuse requires repair in many instances.

k) Using more than one layer of gel on a fixture may result in refracted light between layers, creating an inferior color quality.

l) Gels unprotected from ultraviolet rays from the sun and artificial lighting fixtures are prone to color fading, rendering the gel unusable.

BRIEF SUMMARY OF THE INVENTION

Objects and Advantages

With GELTAPE™, one skilled in the art is able to alleviate or eliminate all of the disadvantages listed above, as well as allow for new uses to be discovered, which can not be obtained using the standard gel. GELTAPE™ is well suited to meet the needs of the technician in situations found in the workplace.

It should be noted that as used herein the term GELTAPE™ refers to the Laminated Adhesive-Backed Color-Correction and Light Diffusion-Filter(s) of the present invention.

Accordingly, several advantages of the present invention are:

a) The adhesive backing requires no tools, clips, tape or other methods of securing the GELTAPE™ in place.

b) There is no concern of adhesive backing casting a shadow or needing to be hidden from a shot.

c) Because of its self-adhesive, the technician can apply GELTAPE™ to the lighting fixture quickly and easily, saving the extra time and energy required when an alternative method of securing is needed.

d) Direct application to lighting fixtures eliminates leakage of uncorrected light.

e) Adhesive backing ensures simple and efficient application to any number of fixtures.

f) The adhesive backing makes GELTAPE™ virtually wasteless. The technician need only use as much as necessary to cover the lighting fixture.

g) Because of its self-securing means, GELTAPE™ needs virtually no area to attach to other than the light's lens.

h) Holes and tears can now be repaired with an exact color match, rendering the entire gelled area usable.

i) Miscalculations in sizing, i.e. cutting GELTAPE™ too short, can be fixed by simply overlapping a second piece of GELTAPE™, rather than having to start fresh with a new piece.

j) GELTAPE™ can be reused throughout the day, then discarded. This ensures perfect color-correction every day.

k) Sandwiching multiple layers of GELTAPE™ for added color can be done because the adhesive backing eliminates the possibility of light refraction between layers.

l) The ultraviolet light protected adhesive layer, extends the true-color lifespan of the gel which is otherwise faded by heat and light intensity coming from the sun and artificial lighting fixtures.

Further objects and advantages of GELTAPE™ are to provide a much more versatile alternative to the widely accepted current gel, while not requiring any additional training or effort on the part of the technician. The benefits of GELTAPE™ are self evident and immediately attained by those already trained in the usage and application of prior art gels.

Still further objects and advantages will become apparent upon consideration of the ensuing description and drawings.

BRIEF DESCRIPTION OF THE SEVERAL VIEWS OF THE DRAWING

Drawing Figures

REFERENCE NUMERALS IN DRAWINGS

| 2 | color-correction/light-diffusion filter (gel layer) |
|---|---|
| 2a | color correction/light-diffusion filter (gel layer) |
| 4 | optically transparent adhesive layer |
| 4a | optically transparent adhesive layer |
| 6 | optically transparent supporting substrate |
| 6a | optically transparent supporting substrate |
| 8 | optically transparent adhesive layer |
| 8a | optically transparent adhesive layer |
| 10 | optically transparent peelable protective film |
| 10a | optically transparent peelable protective film (peeled first) |
| 10b | optically transparent peelable protective film (peeled last) |
| 12 | seam |

SUMMARY

In accordance with the present invention, GELTAPE™ comprises a sheeting layer of gel mounted to one face of an optically transparent double-sided adhesive sheeting layer. An optically transparent peelable protective film is mounted on the opposing face of the double-sided adhesive layer.

Description—FIGS. 1–4

Figure 1:
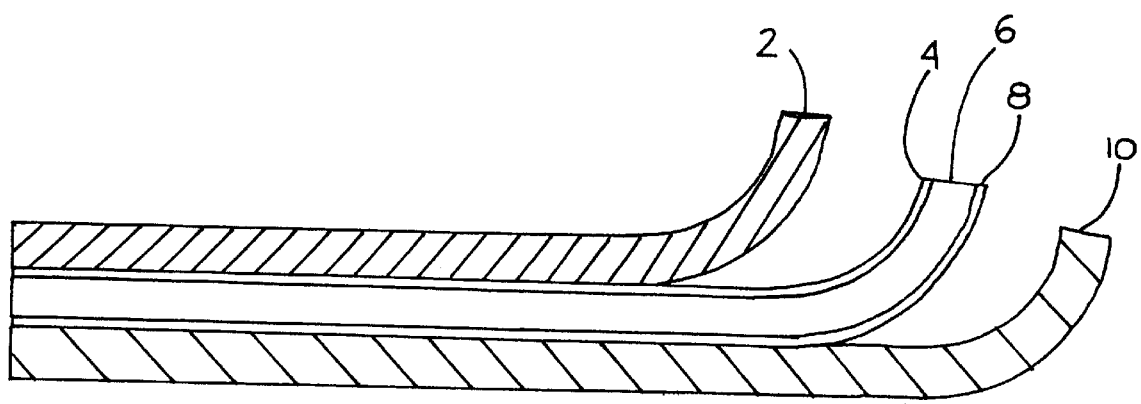
FIG. 1 shows GELTAPE™ in the preferred embodiment, detailing the individual layers.

A typical embodiment of the present invention is illustrated in FIG. 1. The gel (2), colored by various means of dyeing which are well known by those skilled in the art to possess specific desired light-wavelength characteristics, is married to one face of an optically-transparent sheeting layer (6) that has an adhesive coating (4) on one side and an adhesive coating (8) on its opposing other side. The optically transparent adhesive layer (4) is supported by an optically transparent supporting substrate (6) to the other side of which is married a second optically transparent adhesive layer (8). This layer (8) is married to an optically transparent peelable protective film (10). The layers are married in such a way that no distortion, irregularities, or imperfections are detectable on any surface, allowing clear visual inspection. Laminating is the preferred method of marrying the individual layers through a process that is well known to those skilled in the art. The adhesive completely covers the surface of the gel. The preferred embodiment of the gel is available from Lee Filters of N. Hollywood, Calif. However, the gel can consist of any material that is capable of being cut or scored, carrying an adhesive layer, and able to be colored to match light-wavelength characteristics, so as to meet the standards of the industry. Examples include, but are not limited to, polyester, vinyl, polyethylene, polypropylene, plastics, paper, nylon, and glass. The preferred embodiment of the optically transparent double-sided adhesive with peelable protective film, known as "Permatrans", is available from MACTAC of Stow, Ohio. However, any optically transparent sheeting material capable of supporting multiple adhesive layers will work. These materials may be, but are not limited to, plastics, glass, paper, and polyvinyl.

Figure 2:
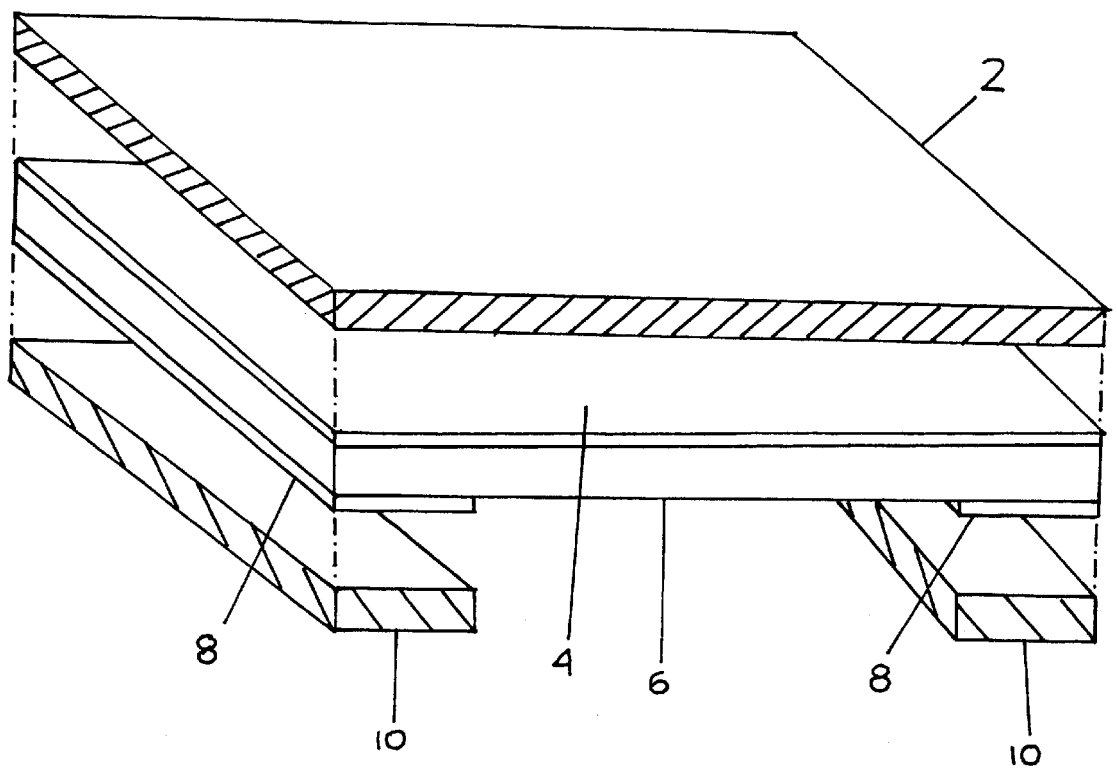
FIG. 2 shows an alternative position for the optically transparent adhesive backing.
Figure 3:
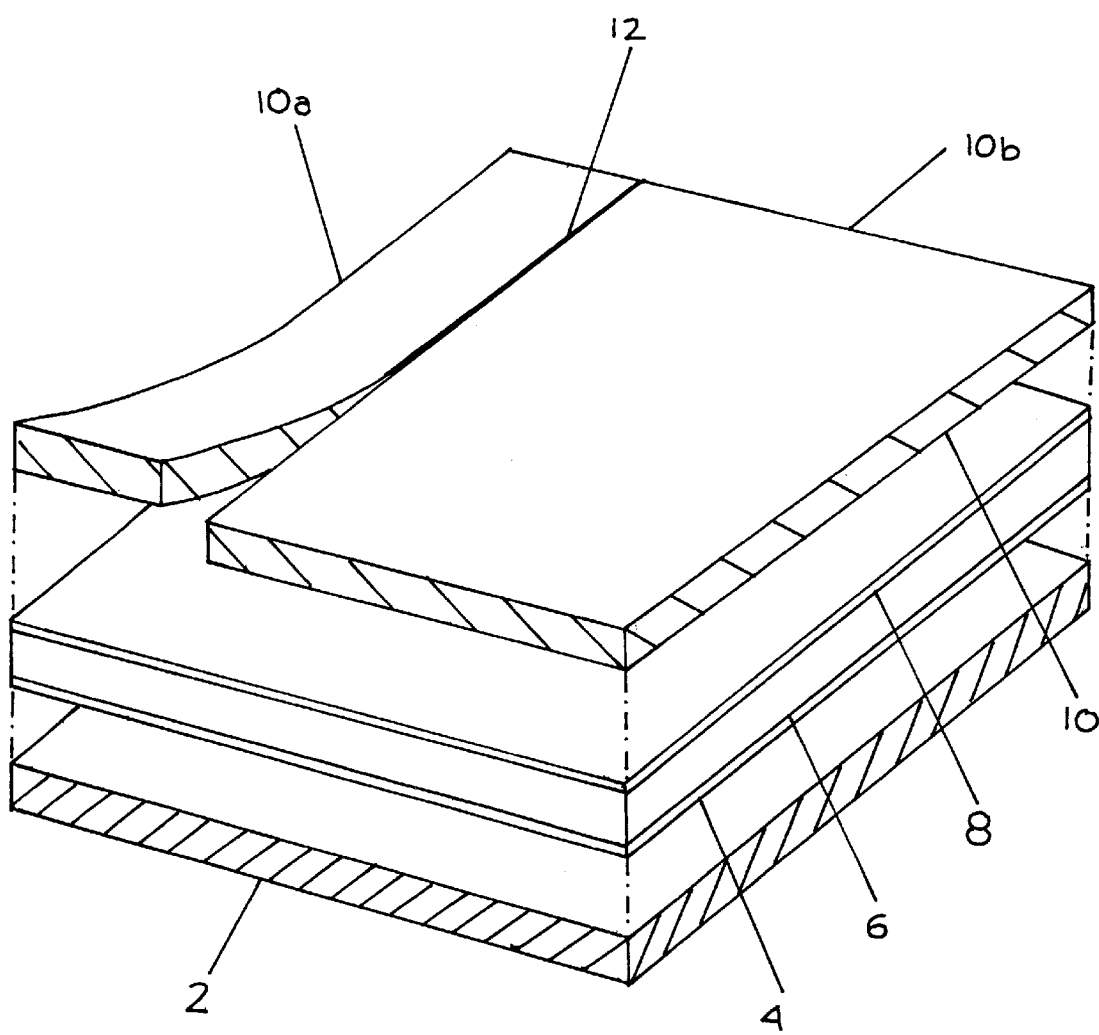
FIG. 3 shows an alternative method for removal of the optically transparent peelable protective film, incorporating a seam.
Figure 4:
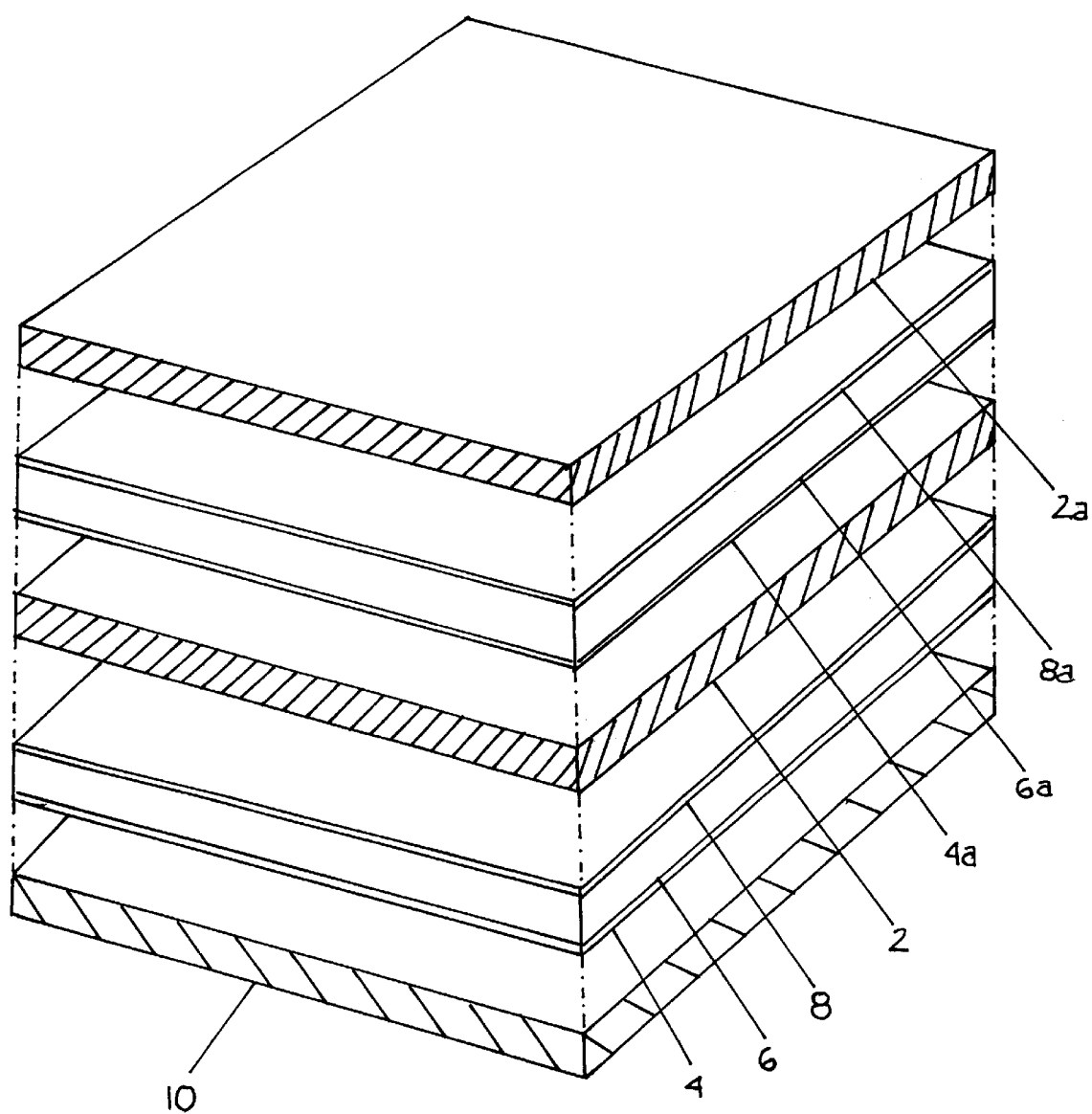
FIG. 4 shows an alternative embodiment wherein a second layer of gel is affixed to the first layer of gel by a second layer of optically transparent supporting substrate disposed between optically transparent adhesive layers.

There are various possibilities with regard to the disposition of the gels, the optically transparent double-sided adhesive and its lamination. As illustrated in FIG. 2, the adhesive may be applied only along the top and bottom edges (in variable widths) of the gel in the finished product. This process is known, to those skilled in the art, as "Zone Coating". As shown in FIG. 3, a seam (12) may be cut down the length of the optically transparent peelable protective film (10), allowing easier removal. The seam (12) is cut so as to score only the optically transparent peelable protective film (10) enabling the optically transparent peelable protective film to be removed in sections (10a) and (10b). As shown in FIG. 4, the embodiment of the present invention may also have a multiplicity of gel layers (2a) as well as a multiplicity of optically transparent supporting substrate layers (6a) interposed between optically transparent adhesive layers (4a) and (8a) to obtain specific effects.

From the description above, a number of advantages of GELTAPE™ are evident.

a) Due to the optically transparent peelable protective film, GELTAPE™ may be used as a standard gel, that is, without exposing the adhesive layer.

b) Due to the optically transparent peelable protective film, the color-corrective effect of GELTAPE™ may be visually checked before application. This is done either by visual inspection or with electronic metering devices known to the industry, so as to ensure the desired lighting effect will be achieved.

c) In manufacturing, the seam may be scored favoring one edge of the surface of the peelable protective film. This allows the technician to peel away each side individually; exposing only the surface that can be managed. The unexposed side, with the peelable protective film still in tact, is free from anything that may distort its color-corrective qualities (dust, fingerprints, accidental adhesion, etc.) before it is ready for application.

Operation—FIGS. 1, 2, 3

The manner of using a preferred embodiment of GELTAPE™ illustrated in FIG. 3 is as follows. A technician skilled in the art needing to color-correct or diffuse artificial or natural light in a photographic, entertainment, or visual media application, i.e. on a movie set, would choose the desired level of color-correction or light-diffusion provided by gel layer (2), then cut the GELTAPE™ to the desired length, using a sharp hand tool, such as scissors or a knife. The peelable protective film (10) would then be bent along the seam (12) until one inside edge of the film lifts slightly off the surface of the adhesive (8). Then using two fingers, the raised edge of the peelable protective film (10), would be pinched to enable removal of the rest of the portion (10a) until the peelable protective film (10a) is removed. The GELTAPE™ would then be applied directly to the lighting fixture or surface. When the exposed adhesive of portion (10a) is adhered, the technician would then peel back the remaining portion (10b) of the peelable protective film, smoothed to remove any air bubbles or distortion. Once application is complete, a perfect, self-adhered, color-corrected surface results.

Removal of the GELTAPE™ is as follows. One skilled in the art would peel back a corner of the GELTAPE™ from the applied surface using a fingernail or sharp hand tool such as a knife, and carefully peel back the GELTAPE™ from the surface. The piece can then be reapplied to another surface, so long as any clouding or distortion caused by prior removal will not adversely affect its next application.

CONCLUSIONS, RAMIFICATIONS, AND SCOPE

Accordingly, it can be seen that the GELTAPE™ of this invention requires no other means of securing or retention. It is applied quickly and easily, saving time and energy. Uncorrected peripheral light leakage is eliminated due to direct application. GELTAPE™ is virtually wasteless, and may be used to repair holes and tears using an exact color match, extending the usability of other gels, which would otherwise have to be discarded. Furthermore, GELTAPE™ can be reused, retaining its adhesive property, then discarded at the end of the day. Sandwiching multiple layers of GELTAPE™ to obtain added color could be done, because the adhesive backing eliminates the possibility of light refraction between layers. The adhesive of the preferred embodiment is heat resistant to 200° F. and is capable of being directly applied to a light lens and removed without leaving any residue.

Furthermore, the GELTAPE™ of the present invention has additional advantages in that GELTAPE™ can perform any of the duties of commercially available gel as well as provide all of the advantages described heretofore.

Seaming the optically transparent peelable protective film in manufacturing, (as in the preferred embodiment), allows for easier removal and cleaner application.

A piece of GELTAPE™ need not cover the entire surface of the lighting fixture, other colors may be used on the same surface, on different areas, to intensify or soften specific parts.

Although the description above contains many specificities, these should not be construed as limiting the scope of the invention but as merely providing illustrations of some presently preferred embodiments of this invention. For example, the present invention, GELTAPE™, may be used in creating artistic and decorative effects such as in stained-glass windows and lampshades. Shapes, letters, and numbers made may be cut or stamped out of GELTAPE™, then arranged, and applied to a surface to make signs and nameplates. GELTAPE™ may also be applied to household lighting fixtures to create mood lighting or to soften light where it is too harsh, i.e. desk lamps and bathroom lighting. Certain colors may also be applied to makeup mirror lights to artificially create the effect of exterior daylight on a lighting fixture possessing artificial interior light characteristics. Thus, the scope of the invention should not be only limited to the examples given above, but to all areas where GELTAPE™ may be useful.

What I claim as my invention is:

1. A laminated adhesive backed color-correction and/or light-diffusion filter comprising:
    a) a gel layer having a predetermined thickness, width and color so as to provide desired color and/or light wavelength characteristics when filter is applied to light source;
    b) an optically transparent substrate support layer of a width at least equal to that of said gel layer, the substrate support layer having a top face and a bottom face, an optically transparent peelable protective film layer, the substrate support layer being disposed between the gel layer and the protective film layer;
    c) a first optically transparent adhesive layer disposed between the gel layer and the transparent substrate layer and serving to bind the gel layer to the top face of the transparent substrate support layer;

d) a second optically transparent adhesive layer between the protective film layer and the bottom face of the substrate support layer and serving to bind the bottom face of the substrate layer to the protective film layer so that when the filter is to be attached to a surface the protective film layer can be removed to expose the second optically transparent adhesive layer and such layer can be employed to anchor the filter to such surface;

e) wherein the optically transparent peelable protective film layer is scored so that a portion thereof can be removed to facilitate positioning of the filter before the remaining portion of the optically transparent protective film layer is removed;

f) wherein a seam is scored along the entire length of of the optically transparent peelable protective film layer;

g) wherein said peelable optically transparent protective film layer can be removed from said optically transparent adhesive layer such that the adhesive quality of said layer be exposed so as to position the filter wherever user may need it.

2. The filter according to claim 1, wherein the first optically transparent adhesive layer and the second optically transparent adhesive layer are comprised of the same adhesive material.

3. The filter according to claim 1, wherein light-diffusing characteristics are imparted through use of the filter.

4. The filter according to claim 1, wherein light-dimming characteristics are imparted through use of the filter.

5. The filter as claimed in claim 1 further including;

a second gel layer having a predetermined thickness, width and color so as to provide desired color and/or light wavelength characteristics;

a second optically transparent substrate support layer of a width at least equal to that of the second gel layer, the second substrate support layer having a top face and a bottom face;

a third optically transparent adhesive layer disposed between the second gel layer and the second substrate support layer and serving to bind the second gel layer to the second substrate support layer;

a fourth optically transparent adhesive layer between the second substrate support layer and the gel layer so as to bind the bottom face of the fourth adhesive layer to the gel layer.

6. The filter claimed in claim 5 wherein the light wavelength characteristics of the second gel layer differs from the light wavelength characteristics of the first gel layer.

\* \* \* \* \*